United States Patent [19]

Itoh et al.

[11] Patent Number: 4,803,065

[45] Date of Patent: Feb. 7, 1989

[54] PRODUCTION PROCESS OF CHLORINE

[75] Inventors: Hiroyuki Itoh; Yoshitsugu Kono; Masanobu Ajioka; Shinji Takenaka; Masafumi Kataita, all of Ohmuta, Japan

[73] Assignee: Mitsui Toatsu Chemicals, Incorporated, Tokyo, Japan

[21] Appl. No.: 64,699

[22] Filed: Jun. 22, 1987

[30] Foreign Application Priority Data

Jun. 30, 1986 [JP] Japan ................ 61-151749
Jun. 30, 1986 [JP] Japan ................ 61-151750

[51] Int. Cl.$^4$ .............................. C01B 7/04
[52] U.S. Cl. ............................ 423/502; 422/240
[58] Field of Search ........... 423/240 R, 240 S, 502; 502/256, 319, 320; 422/240, 241

[56] References Cited

U.S. PATENT DOCUMENTS

| | | | |
|---|---|---|---|
| 134,190 | 12/1872 | Aubertin | 423/502 |
| 2,451,870 | 10/1948 | Richardson et al. | 423/502 |
| 2,982,623 | 5/1961 | Johnson | 422/241 |
| 3,281,405 | 10/1966 | Hogan | 502/256 |

FOREIGN PATENT DOCUMENTS

| | | | |
|---|---|---|---|
| 184413 | 6/1986 | European Pat. Off. | 423/502 |
| 676667 | 7/1952 | United Kingdom | 423/502 |

OTHER PUBLICATIONS

Perry's Chemical Engineers' Handbook, 6th ed., Green et al., eds. McGraw-Hill Book Co, 1984, pp. 23-37, 38.

*Primary Examiner*—John Doll
*Assistant Examiner*—Jeffrey Edwin Russel
*Attorney, Agent, or Firm*—Oblon, Fisher, Spivak, McClelland & Maier

[57] ABSTRACT

An improved process is provided for the production of chlorine. In a fluidized-bed reactor having a specific equivalent diameter and made of a material with a particular iron content, hydrogen chloride and oxygen are reacted in particular gas volumes and at specific molar ratio, superficial velocity, temperature and pressure in the presence of a catalyst composed principally of a chromium oxide and having a specific particle size distribution. The catalyst is filled in a specific amount in terms of catalyst layer height at rest. The catalyst can retain its high activity.

11 Claims, No Drawings

PRODUCTION PROCESS OF CHLORINE

BACKGROUND OF THE INVENTION (i) Field of the Invention:

This invention relates to a process for producing chlorine by oxidizing an off-gas, which contains hydrogen chloride gas, with an oxygen-containing gas, and more specifically to a process for producing chlorine by oxidizing an off-gas, which is discharged in the course of preparation of various compounds, with an oxygen-containing gas in a fluidized-bed reactor.

(ii) Description of the Prior Art:

Chlorine is produced on a large scale by electrolysis of brine. In spite of the ever-increasing demand for chlorine, there is a lower demand for caustic soda which occurs simultaneously upon electrolysis of brine. Under the circumstances, it is hence difficult to cope with this imbalance in demand between these compounds.

On the other hand, a great deal of hydrogen chloride is byproduced in reactions of various compounds, for example, chlorination or phosgenation of organic compounds. Because such byproduction of hydrogen chloride is far greater than its market demand, a substantial portion of hydrogen chloride produced as a byproduct is disposed wastefully without its effective utilization. The cost for its disposal has also come up to big figures.

It is hence possible to meet the high demand for chlorine without development of imbalance with the production rate of caustic soda, provided that chlorine can be recovered efficiently from hydrogen chloride which is thrown away in a large volume as described above.

The reaction in which hydrogen chloride is oxidized to produce chlorine has been known as the Deacon reaction for many years. Copper-base catalyst systems, the history of which goes back to the invention of Deacon in 1868, have conventionally been considered to show the best activity. A number of so-called Deacon catalysts, in which various compounds are added as third components to copper chloride and potassium chloride, have been proposed. These catalytic reactions however require elevated temperature of 400° C. and higher and are accompanied by problems in connection with the service life of the respective catalysts.

A variety of proposal has also been made to use chromium oxides as catalysts instead of such Deacon catalyts. None of such chromium oxide catalysts however exhibit sufficient activity. For example, U.K. Pat. Nos. 584,790 and 676,667 disclose to use $CrO_3$ as a chromia catalyst, in which chromium is trivalent, by having $CrO_3$ carried on alumina and then calcining it or reducing it with hydrogen. They however disclose low conversions only. These chromium oxide catalysts can provide high initial conversions but their activities drop significantly. As an improvement to the processes disclosed in the above U.K patents, it is also proposed in U.K. Pat. No. 846,832 to mix chromyl chloride in hydrogen chloride as one of the raw materials with a view toward maintaining a high conversion.

As has been described above, chromium oxide catalysts are accompanied by a drawback that their activities decrease when reactions are carried out for long periods of time.

SUMMARY OF THE INVENTION

An object of this invention is to provide a process for obtaining chlorine industrially at a high space velocity and a high conversion without drawbacks of the prior art processes, especially, a process for producing chloride industrially by using a chromium oxide catalyst and employing oxygen in an excess amount relative to hydrogen chloride.

The present inventors have carried out an extensive investigation with a view toward attaining the above-described object of this invention. As a result, it has been found that (1) the use of a chromium oxide catalyst prepared by a specific method can produce chlorine at a temperature of 300°–500° C., a high space velocity and a high conversion, provided that oxygen is used in an excess amount relative to hydrogen chloride, (2) for successful adoption of the process in the industry, it is indispensable to practice the process always in an oxidizing atmosphere of oxygen so that the reaction can be carried out for a long period of time while maintaining the activity of the chromium oxide catalyst at a high level, and (3) when the chromium oxide catalyst is used in the reaction for a long period of time, a portion of chromium as an active component is caused to vaporize as its oxides and chlorides and more vaporization takes place as the temperature becomes higher, and it is hence necessary to avoid localized increases of the reaction temperature and to maintain constant the temperature of the catalyst layer.

It has now been found that these objects can be achieved by conducting the oxidation of hydrogen chloride in a fluidized-bed reactor, leading to completion of this invention.

In one aspect of this invention, there is thus provided a process for producing chlorine by reacting hydrogen chloride and oxygen in the presence of a catalyst, which contains a chromium oxide as a principal component thereof, in a fluidized-bed reactor, which comprises:

(i) providing, as said reactor, a fluidized-bed reactor whose gas-contacting portions are each made of a material having an iron content of 1 wt. % or less, said latter reactor having an equivalent diameter of at least 0.05 m;

(ii) filling, as the catalyst, a chromium oxide catalyst, which has a mean particle size of 40–100 μm and a maximum particle size of 200 μm or smaller and contains at least 10 wt. % of particles having particle sizes of 40 μm and smaller, in the thus-provided fluidized-bed reactor, said chromium oxide catalyst being filled in an amount of at least 0.1 m in terms of catalyst layer height in the thus-provided reactor when the chromium oxide catalyst is at rest;

(iii) feeding a first feed gas as an oxygen source and a second feed gas as a hydrogen chloride source into the thus-provided reactor in such amounts that the molar ratio of oxygen in the first feed gas to hydrogen chloride in the second feed gas is at least 0.25 and the hydrogen chloride in the second feed gas is fed at a rate of 100–1800 Nl per hour and per kg of the chromium oxide catalyst filled in the thus-provided reactor;

(iv) allowing the first and second feed gases to flow upwardly at a superficial velocity 0.1–1 m/sec through the thus-provided reactor; and (v) controlling the internal temperature and pressure of the thus-provided reactor at 350°–450° C. and at least normal pressure respectively.

According to the process of this invention, the particulate chromium oxide catalyst is used in the fluidized-bed reactor. The process is therefore substantially free of localized temperature increases which are observed due to the heat of reaction in the catalyst layer when a fixed-bed reactor is used. As a result, less chromium is allowed to evaporate. It is also possible to replenish a fresh supply of the catalyst for the replenishment of the vaporized portion of the chromium or at the time of activity reduction in the course of a continuous operation. The process of this invention is therefore an industrially-valuable process which permits the stable and continuous production of chlorine from hydrogen chloride at a high space velocity and a high conversion for a long period of time.

DETAILED DESCRIPTION OF THE INVENTION

The chromium oxide catalyst (hereinafter abbreviated as "the present catalyst") useful in the practice of the process of this invention contains chromia ($Cr_2O_3$) as its principal component and can be prepared by either precipitation or dipping process. When the precipitation process is followed, chromium hydroxide which has been synthesized as a precipitate from a chromium-(III) salt and a basic compound is calcined at a temperature lower than 800° C. The thus-obtained chromium oxide is ground into particles. Silicon oxide is usually added as a binder, followed by conversion into a slurry. The slurry is thereafter granulated and dried by a spray drier or the like. As an alternative, silicon oxide is added to a slurry of chromium hydroxide which has been formed as a precipitate by the addition of a basic compound to a chromium(III) salt. The thus-prepared slurry mixture is then granulated, dried and calcined. For example, chromium hydroxide is obtained by using chromium nitrate or chromium chloride as a chromium-(III) salt and ammonia as a neutralizing agent which is added to obtain the resultant catalyst in the form of a precipitate. The thus-obtained chromium hydroxide is calcined at a temperature lower than 800° C. A catalyst is then molded by using the thus-obtained chromium hydroxide as a principal component and silicon oxide as a binder.

When the immersion process is relied upon, a water-soluble chromium salt or chromic anhydride ($Cr_2O_3$) is borne, preferably, on silicon oxide as a carrier, the pore volume of which is desirably from 0.3 to 1.5 cc/g, by dipping the silicon oxide in an aqueous solution of the chromium salt or chromic anhydride. The thus-treated silicon oxide is dried and then calcined at 300°–400° C. for 1–2 hours. The above procedure is repeated several times until about 75 wt. % of chromia is supported on the silicon oxide. Thereafter, the silicon oxide with the chromia supported thereon is calcined further at 400°–600° C. for several hours to provide the present catalyst.

Among catalysts prepared in the above described manner, those having mean particle sizes within a range of 40–100 $\mu$m, maximum particle sizes not exceeding 200 $\mu$m and containing at least 10 wt. % of particles having particles sizes of 40 $\mu$m and smaller are preferred as catalysts for use in the fluidized-bed reaction of this invention. So long as a catalyst has such a particle size distribution, its fluidized state is stable and its long-term use is feasible.

If the mean particle size is smaller than 40$\mu$m, the catalyst contains too many fine particles so that these fine catalyst particles are caused to flow out of the reactor and the consumption of the catalyst hence increases. Such a small mean particle size is therefore undesirable.

On the other hand, inclusion of particles greater than 200 $\mu$m is not preferred. Since the catalyst useful in the practice of this invention is composed principally of chromium oxide, the present catalyst is so hard that it does not undergo easy powdering. Accordingly, it tends to abrade the inner wall of reactor. This tendency of abrasion may not cause any serious problem from the practical viewpoint so long as the maximum particle size is somewhat greater than 100$\mu$m. If the maximum particle size exceeds 200 $\mu$m and the content of particles having particle sizes greater than 200 $\mu$m becomes high, some portions of the reactor are however subjected to unignorably severe abrasion so that problems arise in the course of a long-term operation of the reactor.

It is preferable to use a reactor whose gas-contacting portions are made of a material having an iron content of 1 wt. % or less, because the present catalyst is prone to poisoning by iron, is poisoned even by iron contained in the material of the reactor and is unable to retain high activity for a long period of time. It is therefore unsuitable to use a stainless steel such as "SUS 316" or a high-nickel alloy steel such as "Hastelloy B", "Hastelloy C" or "Incolloy" as a material for the reactor, since such a material poisons the present catalyst due to inclusion of iron although it has high corrosion resistance. It is preferable to use a reactor made of a material such as nickel steel or titanium steel.

The equivalent diameter of the reactor should be at least 0.05 m.

Equivalent diameter may be defined by the following equation:

$$\text{Equivalent diameter} = 4 \times (\text{effective volume})/(\text{wetted area}) \quad (I)$$

The equivalent diameter of a reactor is thus determined by the diameter of the reactor, the structures of its vertical and horizontal internals. As mentioned above, the present catalyst is susceptible to iron poisoning. In addition, it is poisoned to some extends by nickel and titanium, resulting in a reduction to the service life of the present catalyst. This tendency is dependent on the equivalent diameter. The service life of the present catalyst decreases as the wetted area increases and the equivalent diameter decreases. Hence, 0.05 m is a practical lower limit for the equivalent diameter. Insertion of one or more internals in a reactor to make the equivalent diameter smaller than the diameter of the reactor is generally said to be effective in mixing the present catalyst and a gas. Smaller equivalent diameters can also show higher activities in the case of the present catalyst than larger equivalent diameters. Accordingly, an equivalent diameter of 0.05–0.5 m is practically desirable in performing the operation with high activity while maintaining the service-life of the present catalyst.

The height of the layer of the present catalyst in the fluidized bed may preferably at least 0.1 m at rest. Any catalyst heights smaller than 0.1 m result in substantial blow-through of reactant gases to the outside the fluidized bed, thereby making it difficult to obtain a stable fluidized bed. When an internal is inserted with a view toward achieving the re-dispersion of reactant gases and maintaining a fluidized state stably, the internal is subjected to severe abrasion by a high-speed gas from a feed gas diffuser so that the internal is rendered unusable in a short period of time.

The superficial velocity of the feed gas mixture through the reactor is 0.1–1 m/sec. The greater the superficial velocity, the better in general for the acceleration of the reaction. An unduly high superficial velocity however leads to rapid abrasion of the reactor by the present catalyst. From the practical standpoint, 1 m/sec is the upper limit. It is important to pay special attention to this upper limit in view of metal hardness, especially, when a nonferrous metal such as high nickel steel is used as a material for the reactor. No substantial differences are observed in reaction results even when the superficial velocity is lower than 0.1 m/sec. However, a superficial velocity lower than 0.1 m/sec results in a considerable reduction to the catalytic activity when the reactor is operated for a long period of time. This can be attributed not only to lowered flowability due to the unduly low gas superficial velocity but also to the occurrence of reduction to the flowability due to changes in physical properties of the present catalyst itself.

The reaction temperature may range from 350° to 450° C. This temperature range is preferable in view of the velocity of conversion of hydrogen chloride into chlorine, the inhibition of vaporization of chromium which is the principal component of the present catalyst, etc.

Any reaction pressure may be used without problems so long as it is at least normal pressure. In a pressure range of from normal pressure to 5 atg, no particular problem arises as to the reaction. The reaction pressure may of course exceed the upper limit. In view of economical consideration such as plant cost and safety measure, it is possible to determine how the pressure of the operation should be set actually.

The amount of the present catalyst to be used is determined practically by the load of hydrogen chloride gas employed as a raw material. The suitable load of hydrogen chloride gas may be 100–1800 Nl, desirably, 200–800 Ni per hour and kg of the present catalyst. If the load is greater than 1800 Nl/hr·cat-1 kg, the conversion of hydrogen chloride is low. Such a high load range is therefore impractical. Any loads lower than 200 Nl/hr·cat-1 kg bring about high conversions but result in higher catalyst consumption and the need for larger reactors. Such low loads are hence uneconomical.

When the reaction is conducted in the presence of catalyst particles in the fluidized-bed reactor, fresh catalyst particles can be fed either continuously or intermittently to replenish the evaporated portion of the chromium while continuing the reaction.

When the present catalyst is used, its catalytic activity cannot be retained for any long period of time unless oxygen gas is used in an amount stoichiometrically greater than hydrogen chloride. An oxygen/hydrogen chloride molar ratio of at least 0.25 is thus required, although the stoichiometric molar ratio of oxygen to hydrogen chloride is 0.25.

The greater the oxygen/hydrogen chloride molar ratio, the more preferable because the activity of the present catalyst can be retained for a longer period of time. There is however a practical need to separate the resulting chlorine from oxygen economically. An upper limit is hence naturally imposed from this need.

As a fluidized-bed reaction, oxygen and hydrogen chloride may be mixed in advance and then fed to the fluidized-bed reactor for their reaction. As an alternative, a raw feed gas may be separated into a first feed gas, which serves as an oxygen source, and a second feed gas which is adapted as a hydrogen chloride source. When the raw feed gas is fed separately, it is effective to feed the first feed gas as an oxygen source at a point upstream of the second feed gas as a hydrogen chloride source relative to the direction of the upward flow of the first and second gases through the fluidized-bed reactor. As described above, the present catalyst may not be able to retain its high activity for a long period of time unless oxygen is used in an amount stoichiometrically greater than hydrogen chloride. Use of the above-described feeding method is convenient when it is desired to minimize the amount of oxygen to be used as a feed gas. When oxygen is used in a large excess, difficulties are encountered upon separation of the resulting chlorine and unreacted oxygen. It is hence uneconomical to use oxygen so much. It is hence necessary to reduce the amount of oxygen to be used. When the first feed gas as an oxygen source is fed at a point upstream the second feed gas as a hydrogen chloride source relative to the direction of the upward flow of the first and second gases through the fluidized-bed reactor as mentioned above, the partial pressure of oxygen becomes higher in a portion (hereinafter called "regeneration zone") of the fluidized bed, which portion extends from an inlet for the first feed gas and another inlet for the second feed gas, so that advantageous effects are brought about as if the oxygen/hydrogen chloride molar ratio is increased.

For the same reasons as those for a upper reaction zone, a gas-contacting portion of this regeneration zone is also made of a material having an iron content lower than 1 wt. %. The hydraulic diameter of the regeneration zone is also required to be at least 0.05 m for the same reasons as those for the reaction zone. Since the temperature and pressure of the regeneration zone are the same as the reaction temperature and pressure of the reaction zone, the temperature and pressure of the regeneration zone generally fall within 350°–450° C. and 0–5 atg respectively. The gas superficial velocity is required to be 0.1–1 m/sec for the same reasons as those for the reaction zone.

The concentration of oxygen in a gas employed as an oxygen source may desirably be 15–100 mole %, while the desirable contacting time between the present catalyst and the feed gases may be at least 1 second. If the concentration of oxygen is lower than 15 mole %, the activity of the present catalyst is lowered to a significant extent even when the contacting time is set longer. Such a low oxygen concentration is therefore unsuitable for maintaining high activity for a long period of time.

Further, the feed gases may contain an inert gas. When an inert gas is contained in oxygen gas or hydrogen chloride gas, the high activity of the present catalyst can generally be retained for a longer period of time. In other words., when the fluidized-bed reaction is carried out by adding nitrogen and/or carbon dioxide, the degree of activity reduction is smaller compared with that occurred in the same reaction under the same conditions except for the superficial velocity. This tendency cannot reasonably be attributed to the increase to the superficial velocity by the addition of the inert gas. It is a result of the fact that the inert gas gives good influence to the flow of the present catalyst. Better results are obtained as the inert gas is added in a greater amount. In view of the above-mentioned economical separation of the resulting chlorine, it is impractical to use the inert gas in a large excess. As a matter of fact, no significant additional advantage is available even when the inert gas is added in any amount more than 5 times in moles the oxygen employed. Therefore, fivefold moles are the upper limit from the practical viewpoint.

The dilution of the feed gas with the inert gas may be effected by mixing the inert gas with the feed gas before its feeding to the reactor or by diluting the oxygen source gas and hydrogen chloride source gas separately with the same or different inert gases and feeding the thus-diluted source gases either separately or as a mixture to the reactor.

EXAMPLES

The present invention will hereinafter be described in further detail by the following Examples and Comparative Examples:

EXAMPLE 1

Dissolved in 750 l of deionized water was 16.9 kg of chromium nitrate, followed by a dropwise addition of 31.3 kg of 25% aqueous ammonia over 6 hours under thorough stirring.

Deionized water was added to the resultant slurry of precipitate to dilute the latter to 1500 l. After allowing the aqueous mixture overnight, the precipitate was repeatedly subjected to decantation to wash same. Colloidal silica was then added in an amount corresponding to 25% of the post-calcination total weight. The slurry mixture was dried in a spray drier and the resulting particulate powder was calcined at 600° C. for 3 hours in an air atmosphere.

The fine particulate crystal was thereafter sifted through JIS standard sieves, thereby obtaining a catalyst having a mean particle size (medium particle size) of 50–60 $\mu$m and a maximum particle size of 120 $\mu$m and containing 12 wt. % or less of fine particles having particle sizes of 40 $\mu$m and smaller.

In a reactor which was made of pure nickel (JIS Standard NNCP; iron content: 0.4 wt. % max.), had a fluidized-bed zone having an equivalent diameter of 0.0545 m and a height of 1,000 mm and is equipped with no internal, 884.4 g of the above catalyst was filled (the height of the catalyst layer at rest: 32 cm). The reactor was externally heated to 380° C. by a fluidized sand bath. Introduced at a superficial velocity of 0.145 m/sec into the catalyst bed were 7.38 Nl/min (500 Nl/kg-catalyst/hr) of hydrogen chloride gas and 3.69 Nl/min (the molar ratio of the oxygen gas to the hydrogen chloride gas: 0.5). Under a pressure of 0.1–0.3 atg, the feed gases were reacted in a fluidized state.

The temperature of the catalyst layer arose to 400° C. due to generation of heat. An off-gas from the reactor was caught by a trap which was composed of an absorption bulb of an aqueous solution of potassium iodide and another absorption bulb of an aqueous solution of caustic soda connected to each other. The aqueous solutions were titrated respectively with sodium thiosulfate and hydrochloric acid so as to quantitatively analyze unreacted hydrogen chloride and the resultant chlorine.

The conversion of hydrogen chloride immediately after the initiation of the reaction was 72%. The conversion was still 70% even 7 days later. Results are shown in Table 1.

EXAMPLE 2

Following the procedure of Example 1, there was provided a reactor which was equipped with a fluidized-bed portion having an inner diameter of 108 mm and a height of 1000 mm, contained no internal and made of pure nickel (JIS Standard: NNCP). The catalyst was filled in an amount of 3516 g (the height of the catalyst layer at rest: 32 cm). Introduced into the catalyst bed were 29.30 Nl/min of hydrogen chloride gas and 14.65 Nl/min of oxygen gas. The feed gases were then reacted at 400° C. in a fluidized state.

The conversion was determined in the same manner as in Example 1. Results are also given in Table 1.

EXAMPLE 3

Following the procedure of Example 1, the catalyst was filled in an amount of 884.4 g (the height of the catalyst layer at rest: 32 cm), 11.79 Nl/min of hydrogen chloride gas and 5.90 Nl/min of oxygen gas were introduced into the catalyst bed, and the feed gases were then reacted at 410° C. in a fluidized state.

The conversion was determined in the same manner as in Example 1. Results are also given in Table 1.

EXAMPLE 4

Following the procedure of Example 1, the catalyst was filled in an amount of 884.4 g (the height of the catalyst layer at rest: 32 cm), 7.38 Nl/min of hydrogen chloride gas and 5.54 Nl/min of oxygen gas were introduced into the catalyst bed, and the feed gases were then reacted at 400° C. in a fluidized state.

The conversion was determined in the same manner as in Example 1. Results are also given in Table 1.

EXAMPLE 5

In a reactor which had a fluidized bed portion having an equivalent diameter of 0.0545 m and a height of 1000 mm, was equipped with no internal, was made of pure nickel (JIS standard NNCP) and was provided with a blowing nozzle at a height 320 mm the way up from the bottom, 1768.8 g of a catalyst obtained in the same manner as in Example 1 was filled (the height of the catalyst layer at rest: 64 cm). The reactor was externally heated at 380° C. by a fluidized sand bath. Hydrogen chloride gas was introduced at 7.38 Nl/min into the catalyst bed through the blowing nozzle while oxygen was introduced at 3.69 Nl/min into the catalyst bed through the bottom of the reactor. The feed gases were reacted at 0.1–0.3 atg in a fluidized state.

An off-gas from the reactor was caught by a trap which was composed of an absorption bulb of an aqueous solution of potassium iodide and another absorption bulb of an aqueous solution of caustic soda connected in series to each other. The aqueous solutions were titrated respectively with sodium thiosulfate and hydrochloric acid so as to quantitatively analyze unreacted hydrogen chloride and the resultant chlorine.

The conversion of hydrogen chloride immediately after the initiation of the reaction was 75%. The conversion was still 74% even 7 days later. Results are shown in Table 1.

EXAMPLE 6

Following the procedure of Example 1, 7.38 Nl/min of hydrogen chloride gas, 3.69 Nl/min of oxygen gas, 1.38 Nl/min of nitrogen gas and 1.38 Nl/min of carbon dioxide gas were respectively introduced into the catalyst bed and were then reacted at 400° C. in a fluidized state. The conversion of hydrogen chloride immediately after the initiation of the reaction was 72%. The conversion was still 71% even 7 days later. Results are shown in Table 1.

EXAMPLE 7

Fine silica gel particles of 80–250 mesh (pore volume: 0.75 cc/g) were immersed in a 20 wt. % aqueous solution of chromic acid. After drying at 120° C., the silica gel particles were calcined at 350°–400° C. for 2 hours in air.

The above procedure was repeated three times. Finally, the thus-prepared silica gel particles were calcined at 500° C. for 3 hours to prepare a catalyst.

The catalyst was analyzed to contain 68 wt. % of chromia and 32 wt. % of silica.

Thereafter, the catalyst was ground and sifted so as to achieve a mean particle size of 50–60μm.

In the same reactor as that employed in Example 1, 884.4 g of the above catalyst was filled (the height of the catalyst layer at rest: 42 cm), 7.38 Nl/min of hydrogen chloride gas and 3.69 Nl/min of oxygen gas were introduced into the catalyst bed, and the feed gases were then reacted in a fluidized state at 400° C. and 0.1–0.3 atg.

The conversion was determined in the same manner as in Example 1. Results are shown in Table 1.

COMPARATIVE EXAMPLE 1

A reaction was carried out at 400° C. in the same manner as in Example 1 except for the use of a reactor made of "Hastelloy C" (Ni content: 55%; Fe content: 5%). The conversion was then determined in the same manner as in Example 1. Results are shown in Table 1.

COMPARATIVE EXAMPLE 2

Following the procedure of Example 1, the catalyst was filled in an amount of 138.2 g (the height of the catalyst layer at rest: 5 cm), hydrogen chloride gas and oxygen gas were introduced respectively at 1.15 Nl/min and 0.58 Nl/min into the catalyst bed, and the feed gases were reacted at 400° C. in a fluidized state. The conversion was then determined in the same manner as in Example 1. Results are shown in Table 1.

TABLE 1

| | Conversion (%) | |
|---|---|---|
| | At initiation of experiment | 7 Days later |
| Example 1 | 72 | 70 |
| Example 2 | 71 | 70 |
| Example 3 | 66 | 62 |
| Example 4 | 80 | 79 |
| Example 5 | 75 | 74 |
| Example 6 | 72 | 71 |
| Example 7 | 73 | 70 |
| Comp. Ex. 1 | 70 | 59 |
| Comp. Ex. 2 | 68 | 58 |

We claim:

1. A process for producing chlorine by reacting hydrogen chloride and oxygen in the presence of a catalyst, which contains a chromium oxide as a principal component thereof, in a fluidized-bed reactor, which comprises:
   (i) providing, as said reactor, a fluidized-bed reactor whose gas-contacting portions are each made of a material consisting essentially of nickel and having an iron content of 1 wt. % or less, said latter reactor having an equivalent diameter of at least 0.05 m;
   (ii) filling, as the catalyst, a chromium oxide catalyst, which has a mean particle size of 40–100 μm and a maximum particle size of 200 μm or smaller and contains at least 10 wt. % of particles having particle sizes of 40 μm and smaller, in the thus-provided fluidized-bed reactor, said chromium oxide catalyst being filled in an amount of at least 0.1 m in terms of catalyst layer height in the thus-provided reactor when the chromium oxide catalyst is at rest;
   (iii) feeding a first feed gas as an oxygen source and a second feed gas as a hydrogen chloride source into the thus-provided reactor in such amounts that the molar ratio of oxygen in the first feed gas to hydrogen chloride in the second feed gas is at least 0.25 and the hydrogen chloride in the second feed gas is fed at a rate of 100–1800 Nl per hour and per kg of the chromium oxide catalyst filled in the thus-provided reactor;
   (iv) allowing the first and second feed gases to flow upwardly at a superficial velocity 0.1–1 m/sec through the thus-provided reactor; and
   (v) controlling the internal temperature and pressure of the thus-provided reactor at 350°–450° C. and at least normal pressure respectively.

2. The process as claimed in claim 1, wherein upon feeding the first and second feed gases to the thus-provided reactor, the first and second feed gases are separated from each other and the first feed gas is fed at a point upstream the second feed gas relative to the direction of the upward flow of the first and second gases through the thus-provided reactor.

3. The process as claimed in claim 1, wherein nitrogen or carbon dioxide or a mixture thereof is contained at a total concentration not greater than 5 times in moles the oxygen, which is fed to the thus-provided reactor, in at least one of the first and second feed gases.

4. The process as claimed in claim 1, wherein the chromium oxide catalyst has been obtained by mixing chromium hydroxide, obtained by reacting a chromium (III) salt and a basic compound in accordance with precipitation process, and silicon oxide and then calcining the resultant mixture at a temperature lower than 800° C.

5. The process as claimed in claim 1, wherein the chromium oxide catalyst has been obtained by dipping silicon oxide in an aqueous solution of a water-soluble chromium salt or chromic anhydride and then drying and calcining the thus-dipped silicon oxide.

6. The process as claimed in claim 1, wherein the hydrogen chloride is fed at a rate of 200–800 Nl per hour and per kg of the chromium oxide catalyst.

7. The process as claimed in claim 1, wherein the oxygen source contains about 15–100 mol % of oxygen.

8. The process as claimed in claim 1, wherein said catalyst has a mean particle size of 50–60 μm, and a maximum particle size of 120 μm, and containing at least 10 wt. % of particles having particle sizes of 40 μm and smaller.

9. The process as claimed in claim 1, wherein said catalyst containing chromium oxide is prepared by a precipitation process comprising:
   (a) calcining chromium hydroxide at a temperature of less than 800° C., thereby obtaining chromium oxide;
   (b) grinding said chromium oxide into particles;
   (c) adding silicon oxide as a binder, and preparing a slurry of the mixture; and
   (d) granulating and drying the mixture.

10. The process as claimed in claim 1, wherein said catalyst containing chromium oxide is prepared by a precipitation process comprising:

(a) forming a slurry of chromium hydroxide;
(b) adding silicon oxide as a binder to said slurry; and then
(c) granulating, drying and calcining said slurry mixture.

11. The process as claimed in claim 1, wherein said catalyst containing chromium oxide is prepared by an immersion process comprising:
   (a) applying chromic anhydride ($Cr_2O_3$) or a water-soluble chromium salt to a carrier of silicon oxide by dipping the same into an aqueous solution of the chromium salt or chromic anhydride;
   (b) drying and calcining the thus-treated carrier, wherein said calcining is effected at about 300° to 400° C. for about 1 to 2 hours;
   (c) repeating steps (a) and (b) for a number of times until about 75 wt. % of chromia is supported on the silicon oxide; and
   (d) further calcining said supported chromia at about 400°–600° C. for several hours.